No. 698,128. Patented Apr. 22, 1902.
J. H. MITCHELL.
DIFFERENTIAL AND REVERSING GEAR.
(Application filed Oct. 22, 1900.)
(No Model.) 3 Sheets—Sheet 1.
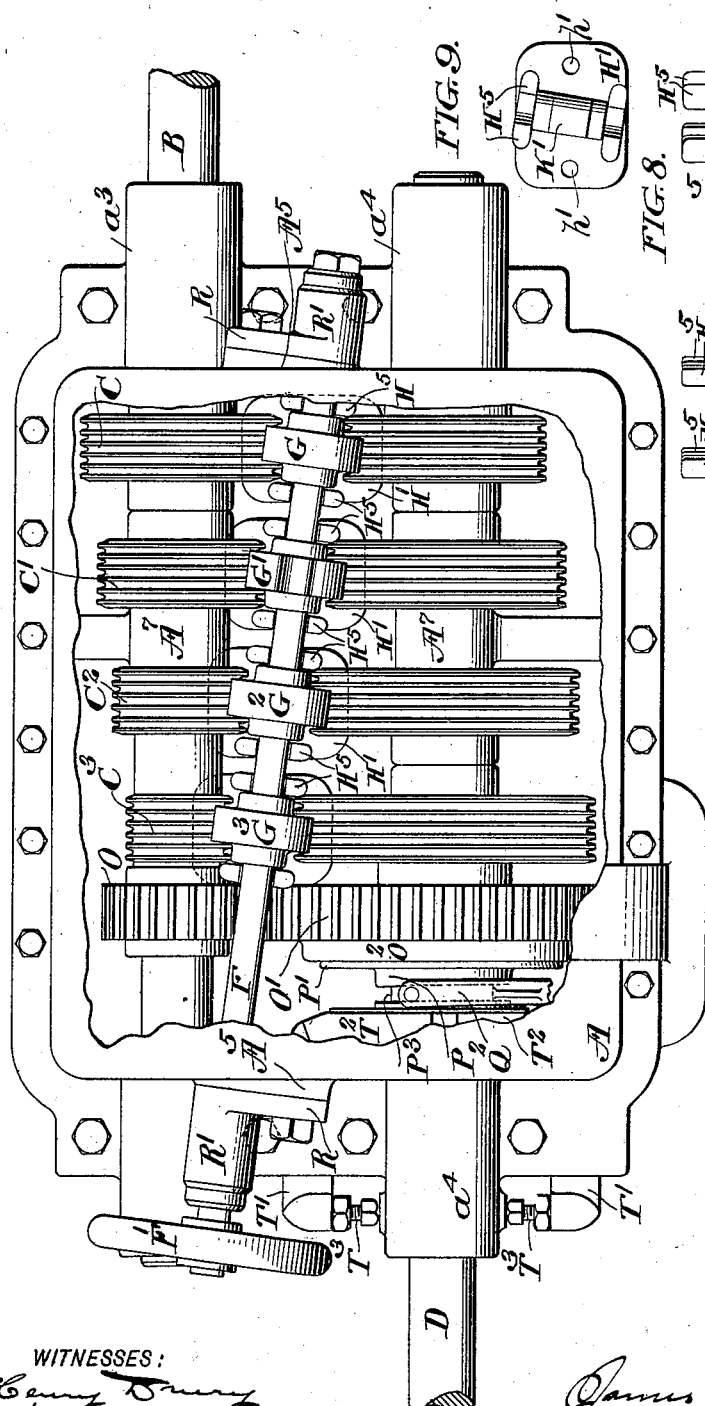
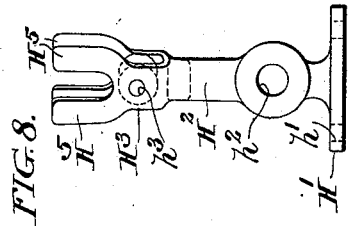
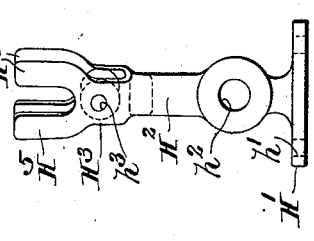
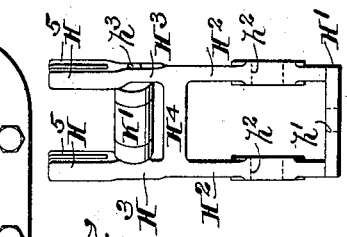
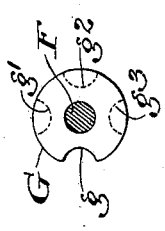
WITNESSES:
INVENTOR
BY
ATTORNEY

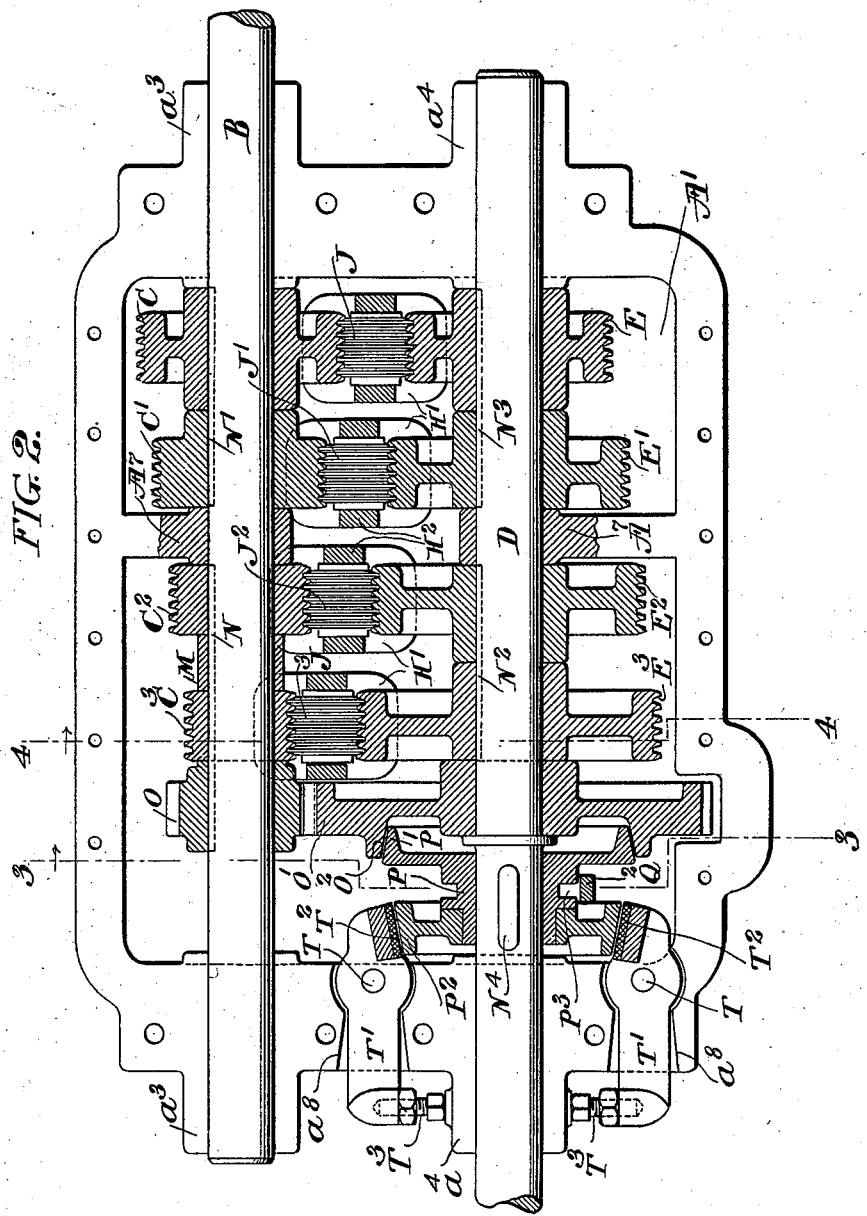

No. 698,128. Patented Apr. 22, 1902.
J. H. MITCHELL.
DIFFERENTIAL AND REVERSING GEAR.
(Application filed Oct. 22, 1900.)
(No Model.) 3 Sheets—Sheet 3.
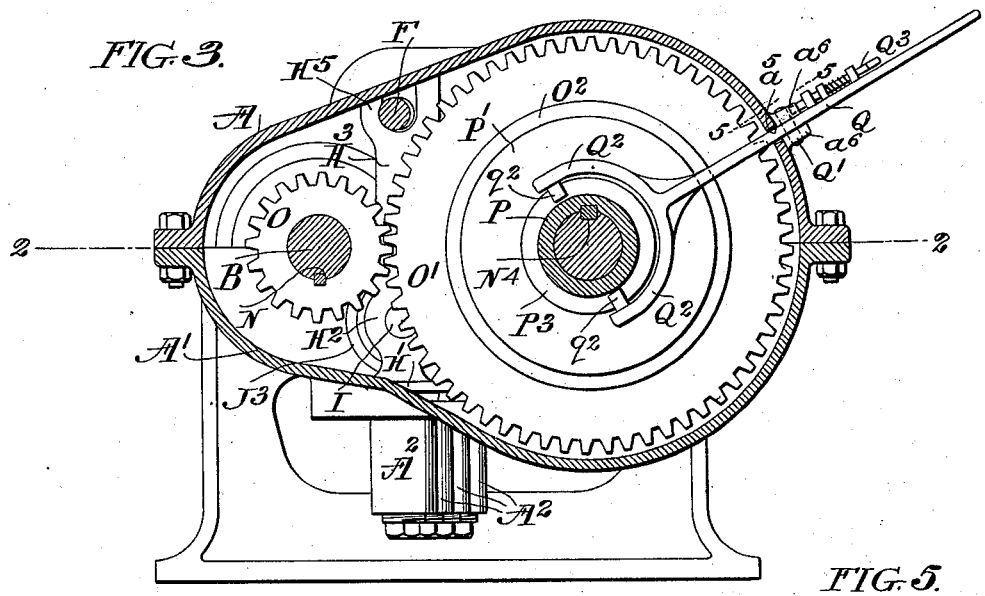
FIG. 3.
FIG. 5.
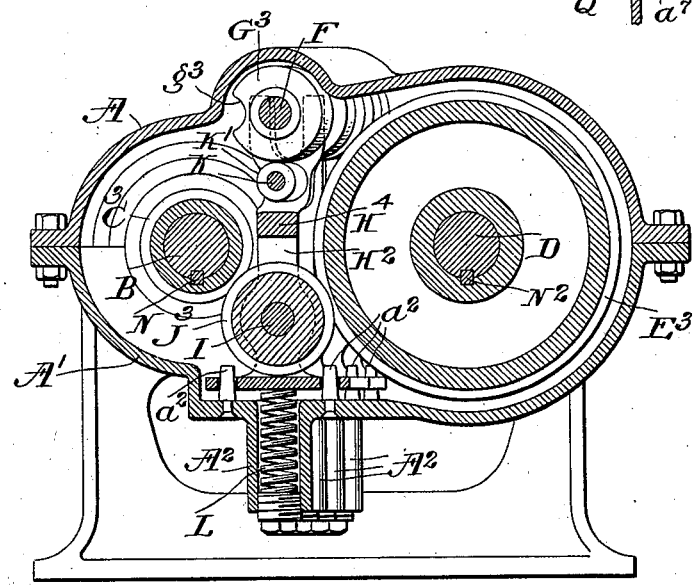
FIG. 4.
WITNESSES:
INVENTOR
James H. Mitchell
BY
his ATTORNEY

UNITED STATES PATENT OFFICE.

JAMES H. MITCHELL, OF PHILADELPHIA, PENNSYLVANIA.

DIFFERENTIAL AND REVERSING GEAR.

SPECIFICATION forming part of Letters Patent No. 698,128, dated April 22, 1902.

Application filed October 22, 1900. Serial No. 33,815. (No model.)

*To all whom it may concern:*

Be it known that I, JAMES H. MITCHELL, a citizen of the United States of America, residing in the city and county of Philadelphia, in the State of Pennsylvania, have invented a certain new and useful Improvement in Differential and Reversing Gear, of which the following is a true and exact description, reference being had to the accompanying drawings, which form a part thereof.

My invention relates to mechanism for transmitting rotary motion with varying speeds and directions, and has for its object to provide a device for this purpose of simple and efficient construction.

The nature of my improvements will be best understood as described in connection with the drawings, in which they are illustrated, and in which—

Figure 1 is a plan view of my device with the top of the casing broken away to show the internal mechanism. Fig. 2 is a horizontal cross-section on the line 2 2 of Fig. 3, the upper part of the casing being removed. Fig. 3 is a cross-section on the line 3 3 of Fig. 2; Fig. 4, a cross-section on the line 4 4 of Fig. 2; Fig. 5, a detached detailed view taken as on the section-line 5 5 of Fig. 3. Fig. 6 is an end view of a cam-shaft, showing the arrangement of cams attached thereto. Fig. 7 is a front view of the yoke holding the intermediate gear-wheel. Fig. 8 is a side view of the same yoke, and Fig. 9 a plan or top view thereof.

A and A' indicate the two parts of the casing in which my mechanism is preferably closed, $A^2$ $A^2$, &c., indicating a series of pockets formed in the under side of the lower section A' and preferably closed, as indicated, by screw-plugs.

$a^2$ $a^2$ are guide-pins projecting upward from the casing A' on each side of the pockets $A^2$.

$a^3$ $a^3$ indicate the bearings formed in the casing for the shaft B. $a^4$ $a^4$ indicate the similar bearings formed in the casing for the shaft D.

$A^5$ $A^5$, Fig. 1, indicate projections from the face of the upper section of the casing, through which are formed perforations for the ends of the cam-shaft F, and against which are bolted the plates R, attached to and supporting the bearings R' R' of the cam-shaft.

$a^5$ (see Fig. 3) indicates a slot formed through the upper casing-section A for the passage of the lever Q. $a^6$ $a^6$ are lugs extending up on each side of this slot, in which is supported the pivot Q' of the lever, and in one of which lugs is formed a detent, as indicated at $a^7$, Fig. 5, for locking lever Q in non-operative position.

$A^7$ $A^7$ (see Figs. 1 and 2) are bearings for the shafts B and D, supported on an intermediate portion of the casing, as shown.

$a^8$ $a^8$ (see Fig. 2) are openings formed through the end of the casing, through which project and in which are provided the brake-levers T' T'.

B indicates the power-shaft, to which are secured a series of power-transmitting wheels, preferably friction-wheels, as shown at C C' $C^2$ $C^3$. These wheels are of varying diameter and, as shown, are keyed to the shaft B by the keys N and N', Fig. 2, M in said figure indicating a spacing-piece between the wheels $C^2$ and $C^3$.

D indicates the shaft to which motion is to be communicated from the shaft B, and to it are secured by the keys $N^2$ and $N^3$ the friction-wheels, (indicated at E, E', $E^2$, and $E^3$,) said wheels being preferably arranged as shown, so that the smaller one corresponds with and forms a pair together with the larger one on the shaft B, and so on.

F is a cam-shaft extending through the casing and having secured to it a series of cams, (indicated at G, G', $G^2$, and $G^3$,) one being provided for each pair of wheels on the shafts B and D. These cams, as shown, are of circular outline, each having a recessed portion, as indicated at $g$, $g'$, $g^2$, and $g^3$, (see Fig. 6,) the recesses in the different cams being arranged in different angular positions, as indicated, ninety degrees apart.

H indicates, Fig. 7, what I call a "yoke-piece" for supporting the intermediate wheels of the system. In its preferred form it is made with a flat base, (indicated at H',) having perforations $h'$ formed in it to receive the guide-pin $a^2$. Above the base-plate H' extend the two standards $H^2$ $H^3$, having formed in them bearings (indicated at $h^2$) to receive the shaft or axis, (indicated at I,) with which or upon which turn the intermediate friction-wheels J, J', $J^2$, and $J^3$. The standards $H^2$ are preferably connected together over the space occupied by the intermediate wheel by a cross-bar H⁴ and are continued above it at a somewhat different angle, as indicated at H³, these continuations being perforated, as indicated at h³, to receive the pin K, supporting the cam-roller K'. The angularly divergent continuations H³ of the standards are further continued in the form of yokes, as indicated at H⁵. One of the yoke-pieces is placed over each of the pockets A², the guide-pins a² extending through its perforation h' and its base H' resting on a spring L, supported in the pocket A². The yokes H⁵ are placed so as to grasp the cam-shaft F on each side of the corresponding cam G G', &c., and the action of the spring L is to bring the roller K' into contact with the face of the cam, the larger diameter of which is sufficient, as indicated in Fig. 4, to hold the intermediate wheel J out of contact with the wheels on the shafts B and D, while the cam-recesses g g', &c., are sufficiently deep to insure that the thrust of the spring L will force the yoke-piece upward and bring the intermediate roll into operative connection with the wheels E and C when the cam portion g comes into registry with the roller K'.

F' indicates a hand-wheel on the end of the cam-shaft, by which it can be turned, and obviously in the construction shown only one of the intermediate wheels is permitted to come into operative contact with its corresponding pair of wheels on the shafts B and D at one time, while each intermediate wheel will be thrown into such operative connection during each complete revolution of the cam-shaft. It will also be obvious that on each turning motion of the cam-shaft the operative intermediate wheel will be thrust out of contact before the next successive intermediate wheel comes into contact. Hence the two shafts are disconnected at any time by a very slight movement of the cam-shaft.

The differential-power-transmitting mechanism above described is that described and shown in my pending application for Letters Patent, Serial No. 21,734, of June 27, 1900, and is therefore not claimed in this application and is shown merely as an instance of the differential and preferably frictional devices by which I vary the speed of the driven shaft.

O is a gear-wheel secured to the shaft B, as shown, by the key N. This gear-wheel is in permanent engagement with the gear-wheel O', loosely journaled on the shaft D and having formed or connected with its outer side a friction-cone, as indicated at O².

P is a sleeve secured by a key N⁴ (see Fig. 2) to the shaft D, said key permitting the sleeve to slide freely on the shaft. To the sleeve P is secured on one side the clutch-cone P', adapted to engage with the cone O², and on the other side the brake-cone P², P³ indicating an annular groove on the sleeve P.

Q is a lever pivoted on the pin Q' (see Fig. 3) and having a yoked end (indicated at Q²) engaged with the groove P³ of the sleeve P by inwardly-extending pins q². The free end of the lever Q, extending through the casing, enables the operator to move the lever to shift the sleeve P in either direction.

Q³ indicates a sliding bolt secured on the outer end of the lever Q and arranged so as to engage with the notch a⁷ (see Fig. 5) in the intermediate position of the lever and sleeve P. By withdrawing the bolt and moving the lever in one direction the sleeve is coupled with the gear-wheel O', which when so coupled drives the shaft B, but in the reverse direction to that in which the frictional gearing is arranged to drive it. When shifted in the other direction, the cone P², connected with the sleeve, engages the braking-jaws T², which, as shown, are supported on the ends of levers T' T', pivoted on the pins T and adjusted by means of set-screws T³ T³. (See Fig. 2.)

When the reversing-clutch is applied, the intermediate friction-gears J J', &c., should be out of contact with the corresponding gear-wheels on the shafts B and D, a condition which, as already stated, can be brought about by a slight movement of the shaft F. If, however, the reversing-clutch is applied while the intermediate gears are still in operative position, all of the devices being friction devices no breakage is likely to occur.

Having now described my invention, what I claim as new, and desire to secure by Letters Patent, is—

1. A device for transmitting rotary motion with varying speeds and directions having in combination two shafts, a series of power-transmitting devices arranged to couple said shafts and each coupling device to transmit its power at a different speed but in the same direction, means for connecting and disconnecting each of said devices, an additional power-transmitting device arranged to couple the shafts so as to actuate the driven shaft in the reverse direction to that in which it is driven by the series aforesaid, a friction-brake, connected clutch and brake cones, as P' P², and means for shifting said cones to connect the reversing device or apply the brake.

2. A device for transmitting rotary motion with varying speeds and directions having in combination two shafts, a series of frictional power-transmitting devices arranged to couple said shafts and each coupling device to transmit its power at a different speed but in the same direction, means for connecting and disconnecting each of said devices, an additional power-transmitting device arranged to couple the shafts so as to actuate the driven shaft in the reverse direction to that in which it is driven by the series of frictional power-transmitting devices aforesaid, and means independent of those used for connecting and disconnecting the other power-transmitting devices for connecting and disconnecting said reverse-motion device.

3. A device for transmitting rotary motion with varying speeds and directions having in combination two shafts, a series of frictional power-transmitting devices arranged to couple said shafts and each coupling device to transmit its power at a different speed but in the same direction, means for connecting and disconnecting each of said devices, an additional power-transmitting device arranged to couple the shafts so as to actuate the driven shaft in the reverse direction to that in which it is driven by the series of frictional power-transmitting devices aforesaid, a friction-brake, connected clutch and brake cones, as $P'$ $P^2$, and means for shifting said cones to connect the reversing device or apply the brake.

JAMES H. MITCHELL.

Witnesses:
CHAS. F. MYERS,
D. HERVATH.